(12) United States Patent
Kunert

(10) Patent No.: US 11,535,210 B2
(45) Date of Patent: Dec. 27, 2022

(54) WHEEL CARRIER ASSEMBLY FOR A FRONT AXLE OR REAR AXLE OF A MOTOR VEHICLE

(71) Applicant: Dr. Ing. h.c. F. Porsche Aktiengesellschaft, Stuttgart (DE)

(72) Inventor: Micha Kunert, Weissach (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/241,228

(22) Filed: Apr. 27, 2021

(65) Prior Publication Data
US 2021/0331652 A1     Oct. 28, 2021

(30) Foreign Application Priority Data
Apr. 28, 2020 (DE) .................... 10 2020 111 517.2

(51) Int. Cl.
    *B60T 5/00*      (2006.01)
    *B60G 13/00*      (2006.01)
    *B60G 7/00*      (2006.01)
    *B60T 1/06*      (2006.01)

(52) U.S. Cl.
CPC ................ *B60T 5/00* (2013.01); *B60G 7/001* (2013.01); *B60G 13/005* (2013.01); *B60T 1/065* (2013.01)

(58) Field of Classification Search
CPC .......... F16D 65/847; B60T 5/00; B60T 1/065; B60G 7/001; B60G 13/005; B60G 2200/142; B60G 3/06; B60G 2206/50; B62D 7/18
See application file for complete search history.

(56) References Cited

U.S. PATENT DOCUMENTS

| | | | | |
|---|---|---|---|---|
| 2,726,742 A | * | 12/1955 | Dunz .................... | F16D 65/827 55/300 |
| 2,955,681 A | * | 10/1960 | Burnett .................. | F16D 55/46 188/264 AA |
| 3,277,985 A | * | 10/1966 | Caskey ................. | F16D 65/092 188/264 AA |
| 4,232,763 A | * | 11/1980 | Klaue .................... | F16D 55/10 188/264 AA |
| 4,317,508 A | * | 3/1982 | Katagiri ................. | F16D 55/22 188/71.6 |

(Continued)

FOREIGN PATENT DOCUMENTS

| | | |
|---|---|---|
| DE | 19943536 C1 | 4/2001 |
| DE | 102014205603 A1 | 10/2015 |

(Continued)

*Primary Examiner* — Paul N Dickson
*Assistant Examiner* — Timothy Wilhelm
(74) *Attorney, Agent, or Firm* — RatnerPrestia

(57) ABSTRACT

A wheel carrier assembly for a front axle or rear axle of a motor vehicle, with a wheel carrier part on which a link for a control arm assembly, a fixing device for a damper strut and a recess for a wheel bearing are provided. The wheel carrier part includes an air guide device for supplying air to a disk brake assembly, which as brake parts has at least a brake disk and a brake caliper. The wheel carrier part has a circumferentially hollow wheel carrier housing part. The air guide device includes at least one air inlet opening and at least one air outlet opening directed onto a brake part.

10 Claims, 1 Drawing Sheet

(56) References Cited

U.S. PATENT DOCUMENTS

| | | | | |
|---|---|---|---|---|
| 4,440,270 | A * | 4/1984 | Ross | F16D 65/847 188/71.6 |
| 4,473,139 | A * | 9/1984 | Oka | F16D 65/847 188/71.6 |
| 4,491,340 | A * | 1/1985 | Von Grunberg | B60T 1/065 301/124.1 |
| 4,503,944 | A * | 3/1985 | Burckhardt | F16D 65/128 301/108.3 |
| 4,561,522 | A * | 12/1985 | Dayen | F16D 65/847 188/71.6 |
| 4,620,616 | A * | 11/1986 | Martin | F16D 65/847 188/71.6 |
| 4,742,884 | A * | 5/1988 | Ishikawa | B62K 25/005 188/71.6 |
| 4,901,826 | A * | 2/1990 | Preiss | B60T 5/00 188/71.6 |
| 4,979,597 | A * | 12/1990 | Mehlitz | B60T 5/00 188/71.6 |
| 5,002,160 | A * | 3/1991 | Weiler | F16D 65/092 188/71.6 |
| 5,727,895 | A * | 3/1998 | Busse | B60T 5/00 188/264 AA |
| 6,196,358 | B1 * | 3/2001 | Nakamura | B62L 3/02 188/24.11 |
| 6,357,562 | B1 * | 3/2002 | Toman | F16D 65/847 188/71.6 |
| 7,337,884 | B2 * | 3/2008 | Paulik | F16D 65/847 188/264 A |
| 8,033,366 | B2 * | 10/2011 | Paulik | F16D 65/847 188/264 A |
| 8,151,951 | B2 * | 4/2012 | Cornolti | F16D 65/847 188/73.31 |
| 8,459,386 | B2 * | 6/2013 | Pickholz | B60K 7/0007 180/65.6 |
| 8,678,426 | B1 * | 3/2014 | Browne | F16D 65/847 165/44 |
| 9,004,241 | B2 * | 4/2015 | Browne | F16D 65/847 188/71.6 |
| 9,126,648 | B2 * | 9/2015 | Nishimura | B62J 35/00 |
| 9,212,713 | B2 * | 12/2015 | Preda | F16D 65/0075 |
| 9,400,025 | B2 * | 7/2016 | Maestrini | F16D 55/228 |
| 9,499,015 | B2 * | 11/2016 | Bittlingmaier | B60C 23/00345 |
| 9,573,567 | B2 * | 2/2017 | Kirkbride | B60T 5/00 |
| 9,587,690 | B2 * | 3/2017 | Boffelli | F16D 65/121 |
| 9,623,848 | B2 * | 4/2017 | Paul | F16D 65/847 |
| 9,669,807 | B2 * | 6/2017 | Wolf | F16D 65/847 |
| 9,902,225 | B2 * | 2/2018 | Riegelsberger | B62D 35/02 |
| 10,227,096 | B2 * | 3/2019 | Fujiu | B62D 35/02 |
| 10,369,854 | B2 * | 8/2019 | Klinger | B60G 7/005 |
| 11,072,313 | B2 * | 7/2021 | Schuemann | B60G 11/22 |
| 2016/0280289 | A1 * | 9/2016 | Watanabe | B62D 35/02 |
| 2021/0129658 | A1 * | 5/2021 | Waide | B60K 11/02 |
| 2021/0138833 | A1 * | 5/2021 | Bosch | F16D 65/847 |

FOREIGN PATENT DOCUMENTS

| | | |
|---|---|---|
| DE | 102018205793 A1 | 10/2019 |
| EP | 3753760 A1 | 12/2020 |
| WO | 2018154502 A1 | 8/2018 |

* cited by examiner

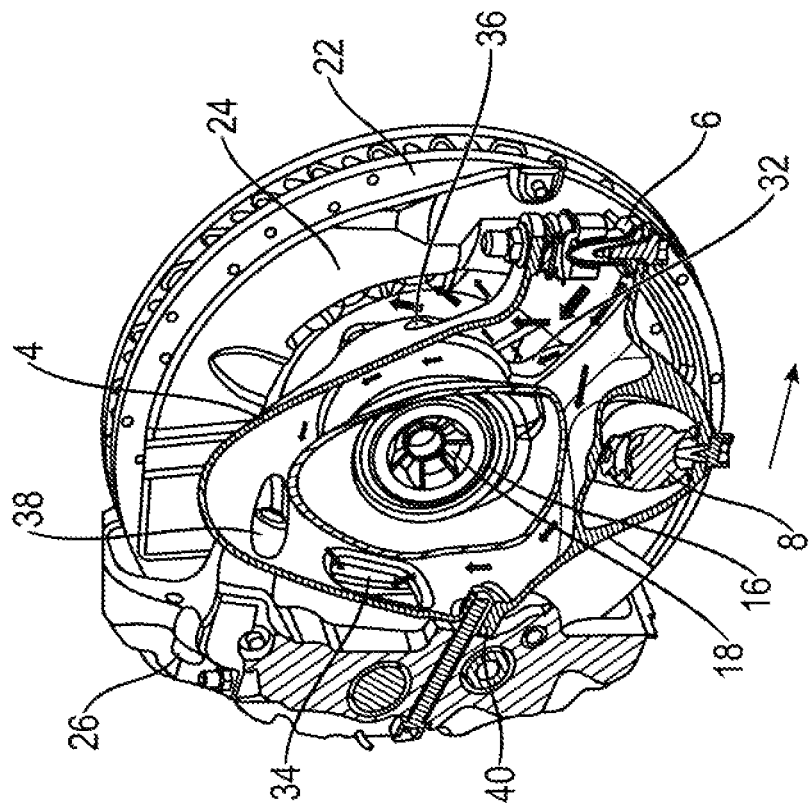
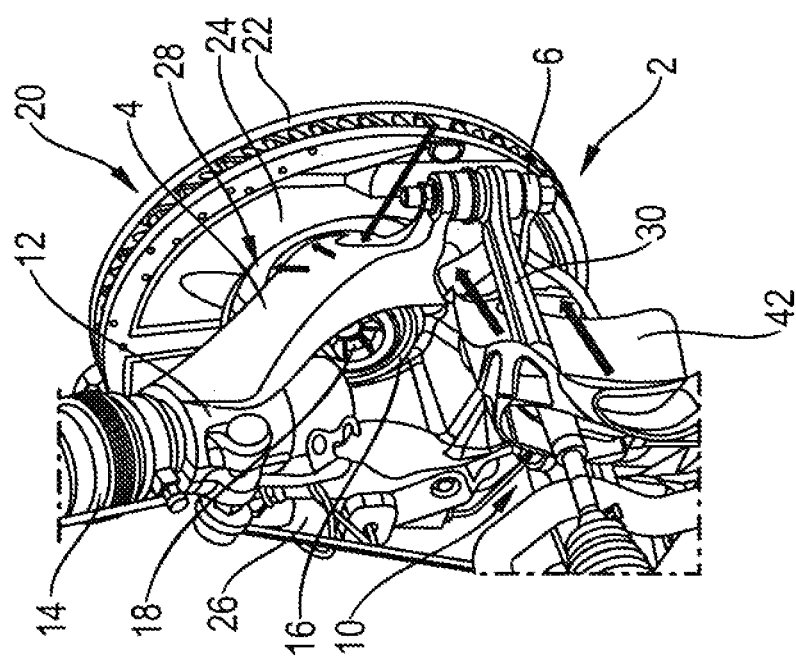

WHEEL CARRIER ASSEMBLY FOR A FRONT AXLE OR REAR AXLE OF A MOTOR VEHICLE

CROSS-REFERENCE TO RELATED APPLICATION

This application claims priority to German Patent Application No. 10 2020 111 517.2, filed Apr. 28, 2020, the content of such application being incorporated by reference herein in its entirety.

FIELD OF THE INVENTION

The invention concerns a wheel carrier assembly for a front axle or rear axle of a motor vehicle, with a wheel carrier part on which linking means for a control arm assembly, fixing means for a damper strut and a recess for a wheel bearing are provided, wherein the wheel carrier part comprises air guide means for supplying air to a disk brake assembly, which as brake parts has at least a brake disk and a brake caliper.

BACKGROUND OF THE INVENTION

Such wheel carrier assemblies have been known for a long time in the prior art. They serve substantially for wheel suspension and are connected to the vehicle body via a control arm assembly and a damper strut. The disk brake assembly for a respective assigned vehicle wheel is also arranged in the region of the wheel carrier assembly. In order now to cool brake parts, such as for example the brake disk, with travel air, it is known, for example from German patent specification DE 199 43 536 C1, which is incorporated herein by reference, to use the outside of the wheel carrier part for air guidance. This cooling may however be inadequate, in particular in driving situations in which high braking energy is required, which can lead to increased wear on the vehicle brakes.

SUMMARY OF THE INVENTION

In view of the foregoing challenges, the wheel carrier part described herein has a circumferentially hollow wheel carrier housing part, wherein at least one air inlet opening and at least one air outlet opening directed onto a brake part are provided as the air guide means. In this way, it is possible firstly to conduct the travel air to the brake parts in a more targeted fashion, and secondly pressure differences may be utilized in order to increase the flow speed of the cooling travel air.

Particularly advantageously, the at least one air inlet opening is formed in the region of a front transverse control arm of the control arm assembly. In this way, in a simple fashion, a high dynamic pressure can be created at the air inlet opening. This effect may be further amplified if an air guide member is provided on the front transverse control arm in order to conduct the travel air to the air inlet opening in targeted fashion.

Particularly preferably, a first outlet opening is provided in the region of the brake caliper in order to cool this by direct air flow. Here, the brake caliper is cooled particularly effectively if the first outlet opening is provided between two fixing points of the brake caliper on the wheel carrier housing part.

Advantageously, a second outlet opening for air flow onto the brake disk and/or a brake part is provided on an opposite side to the first outlet opening, viewed in the direction of travel.

In a particularly compact embodiment, a fixing ring is provided in the upper region of the wheel carrier housing part with respect to a vehicle vertical axis, as a fixing means for the damper strut.

BRIEF DESCRIPTION OF THE DRAWING FIGURES

The invention is explained in more detail with reference to a drawing in which:

FIG. 1 shows a perspective view of a wheel carrier assembly according to aspects of the invention, and FIG. 2 shows the perspective view of the wheel carrier assembly from FIG. 1 in a section through a wheel carrier housing part.

DETAILED DESCRIPTION OF THE INVENTION

FIG. 1 shows a perspective front view of a wheel carrier assembly 2 according to aspects of the invention of a left front axle side of a motor vehicle. The wheel carrier assembly 2 comprises a wheel carrier part 4, which is configured as a wheel carrier housing part and has linking means 6, 8 (see also FIG. 2) for a control arm assembly 10. Also, a fixing means 12 is provided in the form of a fixing ring for a damper strut 14, and a recess 16 for a wheel bearing 18. The fixing means 12 for the damper strut 14 is here configured as a fixing ring and is arranged in the upper region of the wheel carrier housing part 4 with respect to a vehicle vertical axis. Furthermore, a disk brake assembly 20 is shown which, in the present exemplary embodiment, comprises a brake disk 22, a brake chamber 24 and a brake caliper 26 as brake parts.

With such a wheel carrier assembly 2, the brake chamber 24 or brake disk 22 and brake caliper 26 can be cooled to a limited extent by a gap 28 between the wheel carrier housing part 4 and the disk brake assembly 20 (see also drawn arrows). This cooling may not, however, be adequate, in particular in driving situations in which a high braking energy is required. It order now to provide air cooling with a higher through-flow speed at the brake parts such as the brake disk 22, brake chamber 24 and brake disk 26, the wheel carrier housing part 4—as shown in FIG. 2—is formed circumferentially hollow, wherein as air guide means, an air inlet opening 32 is formed in the region of a front transverse control arm 30 of the control arm assembly 10, and two air outlet openings 34, 36 in the region of the brake disk 22 or brake chamber 24 and in the region of the brake caliper 26 respectively. By means of the air inlet opening 32 arranged in the region of the front transverse control arm 30, a dynamic pressure is created in the region of the air inlet opening 32, whereby the travel air is conducted with increased through-flow speed through the hollow wheel carrier housing part 4 to the respective air outlet openings 34, 36 (see also drawn arrows). In this context, it is noted that the term "circumferentially hollow wheel carrier housing part 4" means that the cavity may also be interrupted, for example by the fixing ring 12 for the damper strut 14. It should merely be guaranteed that the travel air can easily pass from the inlet opening 32 to the various outlet openings 34, 36. Here, the first outlet opening 34 for cooling the brake caliper 26 is provided between two fixing points 38, 40 of the brake caliper 26 on the wheel carrier housing part 4. The second outlet opening 36 for air flow onto the brake disk 22 and/or the brake chamber 24 is provided on an opposite side to the first outlet opening 34, viewed in the direction of travel. The direction of travel is indicated by an arrow in FIG. 2.

In order now to further increase the dynamic pressure at the air inlet opening 32, in the present exemplary embodiment (as shown in FIG. 1), an air guide member 42 is provided on the front transverse control arm 30. This conducts the travel air in the direction of the air inlet opening 32 in targeted fashion.

It should be clear that the wheel carrier assembly 2 according to aspects of the invention allows a highly efficient cooling of the brake parts 22, 24, 26 of the disk brake assembly 20 in as simple and economic a fashion as possible.

What is claimed:

1. A wheel carrier assembly for a front axle or rear axle of a motor vehicle, said wheel carrier assembly comprising:
    a wheel carrier part on which links for a control arm assembly, fixing means for a damper strut and a recess for a wheel bearing are disposed,
    wherein the wheel carrier part comprises a circumferentially hollow wheel carrier housing part for supplying air to a disk brake assembly having at least a brake disk and a brake caliper that are each positioned outside of the hollow wheel carrier housing part, and wherein a hollow region of the circumferentially hollow wheel carrier housing part extends about an entire circumference of the wheel bearing,
    wherein the circumferentially hollow wheel carrier housing part comprises (i) at least one air inlet opening, (ii) a first air outlet opening facing the brake caliper through which air is distributed out of the wheel carrier part and onto the brake caliper, and (iii) a second air outlet opening facing the brake disk through which air is distributed out of the wheel carrier part and onto the brake disk.

2. The wheel carrier assembly as claimed in claim 1, wherein the at least one air inlet opening is formed in a region of a front transverse control arm of the control arm assembly.

3. The wheel carrier assembly as claimed in claim 2, wherein an air guide member is provided on the front transverse control arm.

4. The wheel carrier assembly as claimed in claim 1, wherein the first outlet opening is provided between two fixing points of the brake caliper on the wheel carrier part.

5. The wheel carrier assembly as claimed in claim 1, wherein the second outlet opening is provided on a side opposite to the first outlet opening, as viewed in a direction of travel.

6. The wheel carrier assembly as claimed in claim 1, wherein fixing means for the damper strut comprises a fixing ring disposed in an upper region of the wheel carrier housing part with respect to a vehicle vertical axis.

7. The wheel carrier assembly as claimed in claim 1, wherein the outlet openings are holes that are formed on an outer wall of the circumferentially hollow wheel carrier housing part, and an inner wall of the circumferentially hollow wheel carrier housing part forms the recess for the wheel bearing.

8. The wheel carrier assembly as claimed in claim 1, wherein a first closed passageway is formed in the circumferentially hollow wheel carrier housing part that extends between the air inlet opening and the second air outlet opening facing the brake disk.

9. The wheel carrier assembly as claimed in claim 8, wherein a second closed passageway is formed in the circumferentially hollow wheel carrier housing part that extends between the air inlet opening and the first air outlet opening facing the brake caliper.

10. The wheel carrier assembly as claimed in claim 9, wherein the first and second closed passageways are connected.

* * * * *